US011996068B2

United States Patent
Tan et al.

(10) Patent No.: US 11,996,068 B2
(45) Date of Patent: May 28, 2024

(54) DEVICE AND METHOD FOR SYNCHRONIZED SHUTTER CONTROLS FOR EXTERNAL DISPLAYS

(71) Applicant: Dell Products L.P., Round Rock, TX (US)

(72) Inventors: Geroncio Ong Tan, Austin, TX (US); Marcin M. Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/730,133

(22) Filed: Apr. 26, 2022

(65) Prior Publication Data

US 2023/0343306 A1   Oct. 26, 2023

(51) Int. Cl.
*G09G 5/12* (2006.01)
*G06F 1/16* (2006.01)
*H04N 23/60* (2023.01)

(52) U.S. Cl.
CPC ............. *G09G 5/12* (2013.01); *G06F 1/1686* (2013.01); *H04N 23/60* (2023.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2015/0264317 A1* | 9/2015 | Takahashi | ............. | G09G 5/006 348/14.09 |
| 2016/0148557 A1* | 5/2016 | Hori | ..................... | G09G 3/2096 345/212 |
| 2018/0165235 A1* | 6/2018 | Park | ..................... | G06F 13/385 |
| 2021/0136846 A1* | 5/2021 | Ponnusamy | ............ | H04W 4/80 |
| 2023/0152871 A1* | 5/2023 | Lee | ........................ | G06F 1/3215 713/300 |

* cited by examiner

*Primary Examiner* — Andre L Matthews
(74) *Attorney, Agent, or Firm* — Terrile, Cannatti & Chambers, LLP; Emmanuel A. Rivera

(57) ABSTRACT

Described are a system and methods for synchronizing control of an information handling system, such as a notebook computer, with external devices, such as displays, where the synchronizing control is performed for similar components on the information handling and external display, such as camera shutters.

17 Claims, 6 Drawing Sheets

DEVICE AND METHOD FOR SYNCHRONIZED SHUTTER CONTROLS FOR EXTERNAL DISPLAYS

BACKGROUND OF THE INVENTION

Field of the Invention

The present invention relates to information handling systems. More specifically, embodiments of the invention provide for synchronized control of camera shutters of external monitors of information handling systems.

Description of the Related Art

As the value and use of information continues to increase, individuals and businesses seek additional ways to process and store information. One option available to users is information handling systems. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such a notebooks and laptops, make use of integrated components such as electromagnetic camera shutters. Camera shutters allow for image and video capture for use such as in video conferencing. In certain instances, an information handling system, such as notebook computer is connected to one or more devices, such as displays or monitors. Implementations provide for displays or monitors to have their own independent integrated electromagnetic camera shutters. A user can activate/deactivate the camera shutter on a notebook computer, and can activate/deactivate the camera shutter on display, while the notebook computer and display are connected; however, there is no universal activation/deactivation of the camera shutters on the notebook computer and the display. In other words, if one of the camera shutters is activated/deactivated, the action does not activate/deactivate the other camera shutter.

Furthermore, the camera shutters control image and video feed from a notebook computer. For example, during a video conference, a camera shutter allows for video to be passed from the notebook computer. Therefore, it would be desirable that when cameras shutters of the notebook computer and the display(s) are activated or deactivated, the image and video feed from the notebook computer should be stopped or allowed to pass through.

SUMMARY OF THE INVENTION

Systems and computer-implementable method for synchronizing control of a similar component of an information handling system (IHS) and with external devices comprising determining if a similar component on the IHS or an external device is enabled or disabled; creating a message at the IHS or the external device as to enabling or disabling of the component; sending the message to a power delivery (PD) controller of the IHS or the external device; sending the message received by the power delivery (PD) controller of the IHS or the external device to another PD controller of a connected external device or a connected IHS; processing the message at the connected external device or the connected IHS; and enabling or disabling a similar component on the connected external device or the connected IHS based on the processed message.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide for system and methods for synchronizing control of an information handling system, such as a notebook computer, with external devices, such as displays, where the synchronizing control is performed for similar components on the information handling and external display, such as camera shutters.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
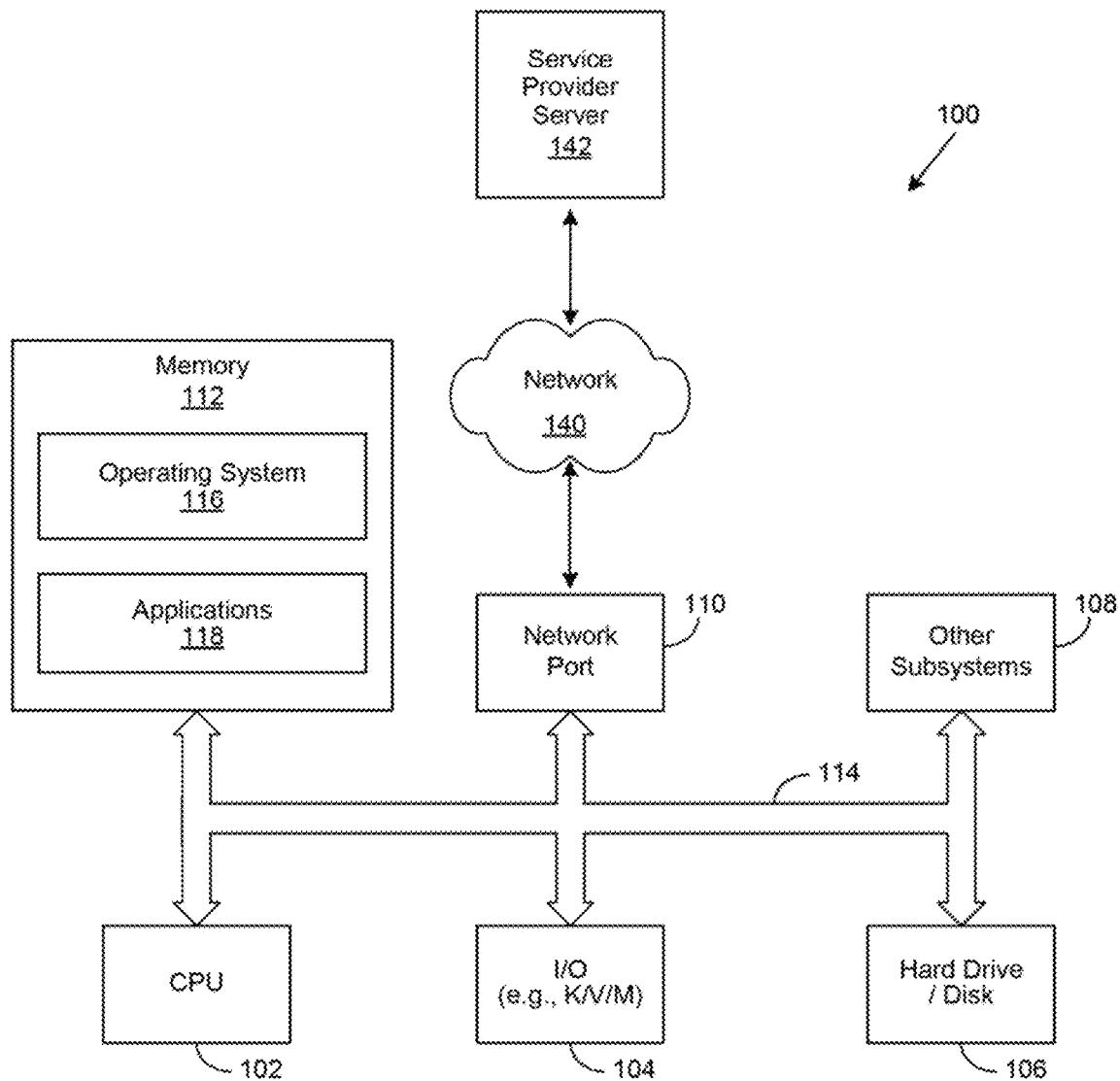
FIG. 1 is a general illustration of components of an information handling system as implemented in the present invention.

FIG. 1 is a generalized illustration of an information handling system 100. The information handling system 100 can be implemented as a computer, such as a desktop, server, tablet, laptop, or notebook, etc. The information handling system 100 includes a processor(s) (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. Various implementations provide for the I/O devices 104 to be external peripheral devices, such as keyboards, webcams, monitors, displays, etc. Implementations provide for such external devices are connected using cables based on standards such as universal serial bus (USB), including USB Type C.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include applications 118.

Figure 2:
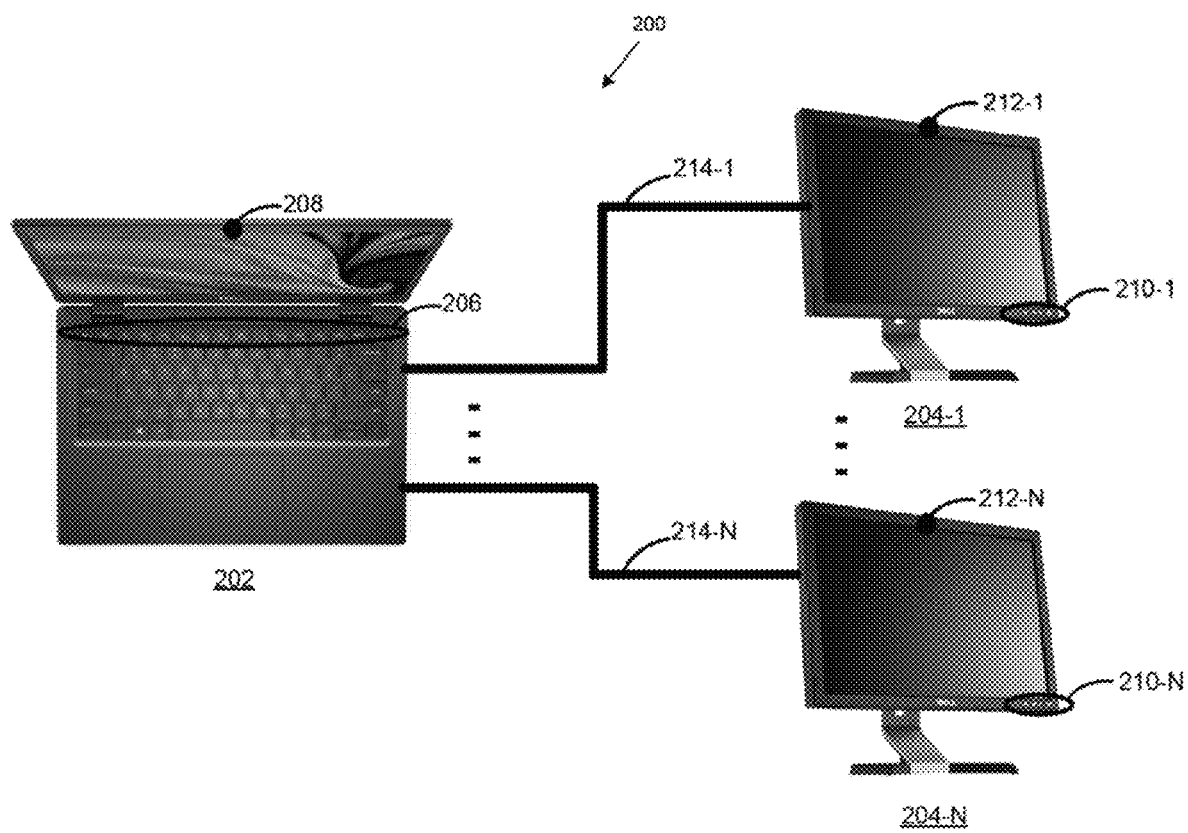
FIG. 2 illustrates a system of connected notebook computer with one or more displays providing synchronized control of camera shutters as implemented in the present invention.

FIG. 2 shows a system 200 of a notebook computer 202 with one or more displays 204. Implementations provide for the notebook computer 202 to be configured as an information handling system 100 described in FIG. 1. Likewise, the one or displays 204 are configured as connected peripheral devices 104 described in FIG. 1.

Although, displays 204 are described as an example, it is contemplated that implementations can include different or other peripheral devices, such as web cams. In particular, as further described herein, the notebook computer 100 and peripheral devices, such as displays 204 are implemented with power delivery (PD) controllers and make use of communication protocols, such as implemented by standards such as USB Type C.

Embodiments provide for the notebook computer 202 to include function keys 206, which can be programmable or dedicated function keys, typically identified on standardized keyboards as F1, F2, F3, F4, F5, F6, F7, F8, F9, F10, F11, and F12. The function keys 206 each can provide a special function defined by the operating system (e.g., operating system 116) or an active program/application (e.g., applications 118) of the notebook computer 202. In certain implementations, an external keyboard (not shown) is connected to the notebook computer 200 and includes the function keys 206.

Implementations provide for one or more of the function keys 206, such as F4 or F9 to activate or deactivate an integrated camera shutter 208 of the notebook computer 202. Implementations provide for camera shutter 208 to be an electromagnetic camera shutter. When a user depresses a function key associated with the camera shutter 208, either on the notebook computer 202 or an external keyboard, the camera shutter 208 is activated or deactivated. The control and operation of the activating and deactivating the camera shutter 208 is further described herein.

The one or more displays 204 include dedicated external control buttons 210. In this example, display 204-1 includes control buttons 210-1, and display 204-N includes display buttons 210-N. A dedicated button on control buttons 210 is configured to activate or deactivate an integrated camera shutter 212 of the respective display 204. When a user depresses the dedicated control button of control buttons 210 associated with the camera shutter 212, the camara shutter is activated or disactivated.

Implementations provide for the notebook computer 202 to connect to the one or more displays 204 by a dedicated connectors and cables represented by connections 214. The connections 214 include USB Type C defined connectors and cables, which implement protocols as defined by the USB Type C standard.

As further described herein, when one of the function keys that activates or deactivates the camera shutter 208 or one of the buttons of respective buttons 210 that activates or deactivates respective camera shutters 212 is depressed by a user, the other camera shutter (i.e., camera shutters 212 or camera shutter 208) is activated or deactivated. Deactivation includes preventing image or video feed from notebook computer 202. Various implementations also provide for deactivation to include preventing audio feed a microphone/mic (not shown) of the notebook computer 202.

Figure 3:
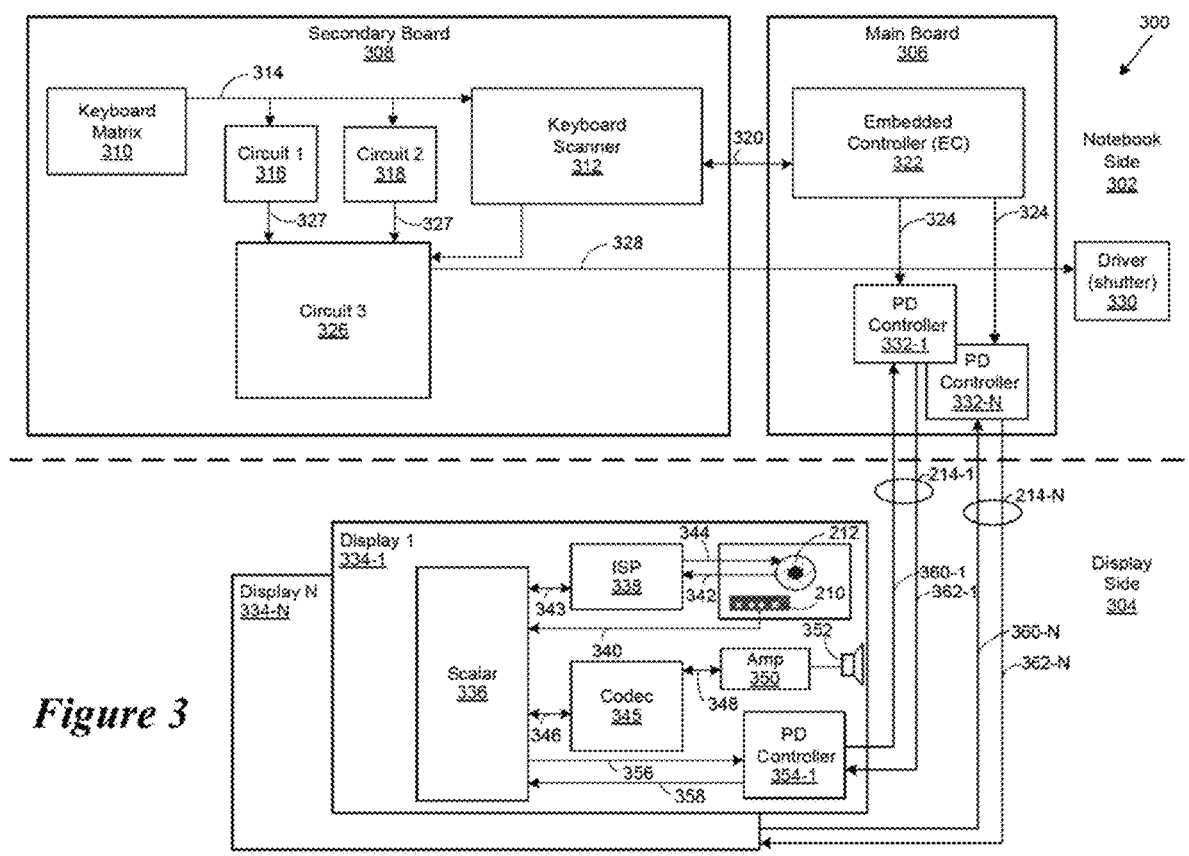
FIG. 3 illustrates architectures of a notebook computer with one or more displays providing synchronized control of camera shutters as implemented in the present invention.

FIG. 3 shows architectures 300 of a notebook computer with one or more displays providing synchronized control of camera shutters. The architectures 300 include an information handling system architecture or notebook side 302, and display architectures or display side 304.

Implementations provide for the notebook side 302 to include a main board 306 and secondary board 308. A keyboard matrix 310 is configured to function keys 206. When a key, such as F4/F9 is pressed by a user, the keyboard matrix 310 detects the key press and instructs circuitry as described herein. In particular, a keyboard scanner 312 receives the key press 314, as well as a circuit 1 316 and circuit 32 318.

The keyboard scanner 312 provides an instruction to take action through a general purpose input/output (GPIO) signal 320 to an embedded controller (EC) 322. The EC 322 receives the GPIO signal 320, and in turn instructs on a return message 320 to the keyboard scanner 312 to take the action. The action or command is either to open or close the camera shutter 208.

The action is sent 324 to a circuit 3 326. Implementations provide for the circuit 3 326 to include a gate that allows for the command from the EC 322 to be passed on to either open or close the camera shutter 208. Regardless of whatever the command is to open or close the camera shutter 208 provided by the EC 322 to the keyboard scanner 312, the gate allowing commands to pass to open or close the camera shutter is dependent on circuit 1 316 and circuit 2 318. Circuit 1 316 and circuit 2 318 depend on a user pressing a function key (e.g., F4/F9). Circuit 1 316 and circuit 2 318 provide control 327 to open or close the gate of circuit 3 326. In an implementation, circuit 1 316 is associated with the F4 key and opens and closes a mic of the notebook computer 202. Circuit 2 318 is with the F9 key and opens and closes camera shutter 208 of the notebook computer 202. Therefore, unless a user presses a function key, the gate of circuit 3 326 is not open, and no commands are sent. If the gate is open, the command 328 is sent to a driver (shutter) 330 that opens or closes the camera shutter 208.

In various embodiments, the main board 306 includes one or more power delivery (PD) controllers 332-1 to 332-N. The EC 322 encrypts a message for shutter open/close and sends the encrypted message 324 to PD controllers 332. Implementations provide for messages, including encrypted message 324 between the notebook computer 202 and displays 204, to be specific to vendor (i.e., vendor defined message) of the notebook computer 202 and displays 204.

Implementations provide for one or more displays 334-1 to 334-N to be connected to the notebook architecture or notebook side 302 through respective connections 214-1 to 214-N as described herein. As discussed above, connections 214 are defined standardized communication connectors and cables implementing protocols, such as USB Type C standard.

In this example, the architecture describing display 1 334-1 is replicated for the other displays 334. In various embodiments, display 1 334-1 includes control buttons 210 and integrated camera shutter 212. Implementations provide for a touch controller (not shown) to detect when a buttons are pressed in control buttons 210.

Display 1 334-1 includes a scalar 336 and an integrated signal processor (ISP) 338. The scalar 336 receives an event 340 as to when a user presses a button on control buttons 210, where the pressed button turns on or off the camera shutter 212. The camera shutter 212 provides status 342 to the ISP 338 as to open or close. The ISP 338 communicates 343 with the scalar 336, including status of the camera shutter 212. The ISP 338 also instructs the camera shutter to open or close by message 344.

Implementations provide for a Codec 345 to communicate 346 to the scalar 336. Depending on the status of the camera shutter 212, the codec 344 instructs 348 an amp 350 to drive a speaker 352 to either provide sound. If status of the camera shutter 212 is open, the speaker 352 provides sound. If status of the camera shutter 212 is close, the speaker 352 does not provide sound.

Implementations provide for the display 334-1 to includes a power delivery (PD) controller 354-1. The scalar 336 informs by sending an encrypted message 356 to the PD controller 354-1 if a button of buttons 210 is depressed by a user to turn on or off the camera shutter 212. If the PD controller allows data 358 (e.g., image/video feed) to be sent to the scalar 336 and display 334-1 architecture for processing.

The PD controllers 354 of display architectures 334 either send encrypted messages or send data (e.g., image/video feed) by line 360 to PD controllers 332 of the notebook side by line 360, if the button of buttons 210 is depressed by a user. The encrypted message 356 from PD controller 354-1 informs the PD controllers 332 to turn on or off the camera shutter 208 of notebook computer 202.

The PD controllers 332 of the notebook side 302 either send encrypted messages or send data (e.g., image/video feed) by line 362 to PD controllers 354 of the displays 334, if a function key is depressed by a user.

Figure 4:
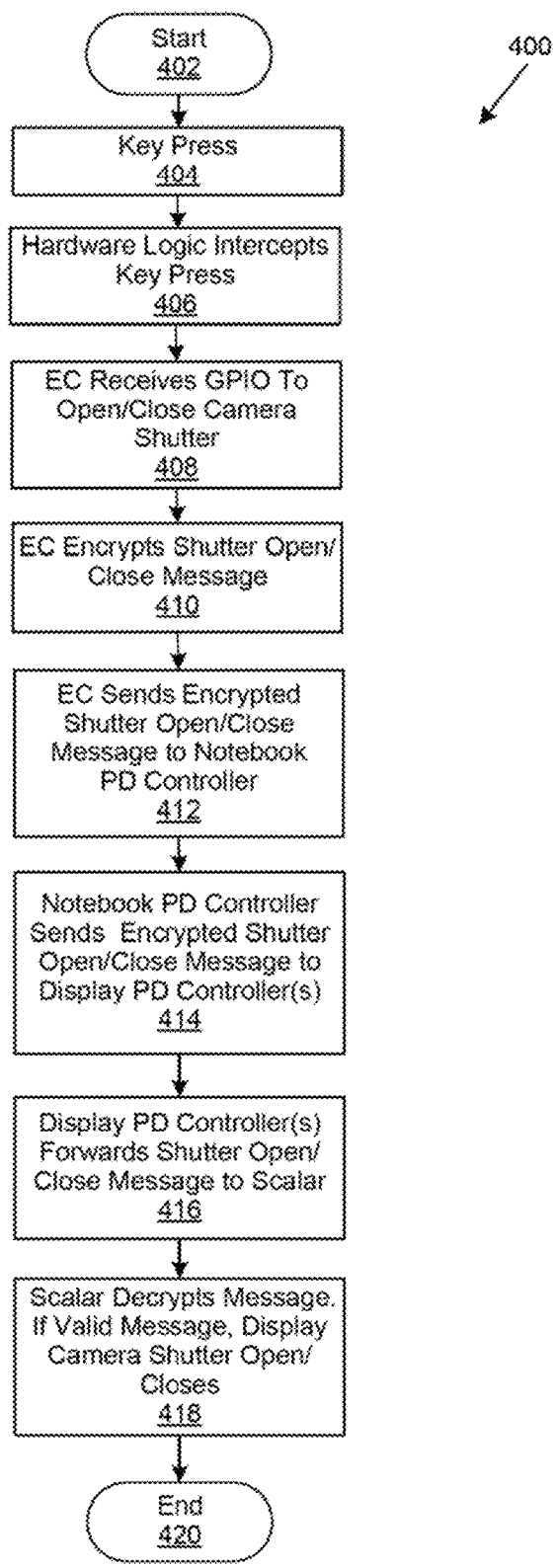
FIG. 4 is a generalized flowchart for activating and deactivating camera shutters when a function key on a notebook computer is pressed as implemented in the present invention.

FIG. 4 is a generalized flowchart for activating and deactivating camera shutters when a function key on a notebook computer is pressed. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, a function key, such as the F4 or F9 key of a keyboard on the notebook computer 202 or of an external keyboard is pressed. At step 406, hardware logic of the notebook computer 202 detects and intercepts the keyboard press. In particular, the keyboard matrix 310 detects the keyboard press.

At step 408, embedded controller (EC) 322 receives general purpose input/output signal (GPIO) signal 320 to open or close the camera shutter 208 of the notebook computer 202. The GPIO signal 320 is provided by keyboard scanner 312.

At step 410, the EC 322 encrypts a message to open or close the camera shutter 208. At step 412, the EC 322 sends the encrypted message 324 to one or more power delivery (PD) controllers 332.

At step 414, the one or more power delivery (PD) controllers 332 sends the encrypted message 324 to PD controller(s) 354 of one or more displays 212. The encrypted message is sent by lines 360, which are part of connections 214 that include defined standardized communication connectors and cables implementing protocols, such as USB Type C standard.

At step 416, the PD controller(s) 354 forwards the encrypted message 324 to scalar 336. The encrypted message 324 instructs to open or close camera shutter 212 of the display 204 to scalar 336. At step 418, the scalar 336, decrypts the encrypted message 324. If the message is valid, the scalar 336 instructs the ISP 338 to open or close the camera shutter 212. At step 420, the process 400 ends.

Figure 5:
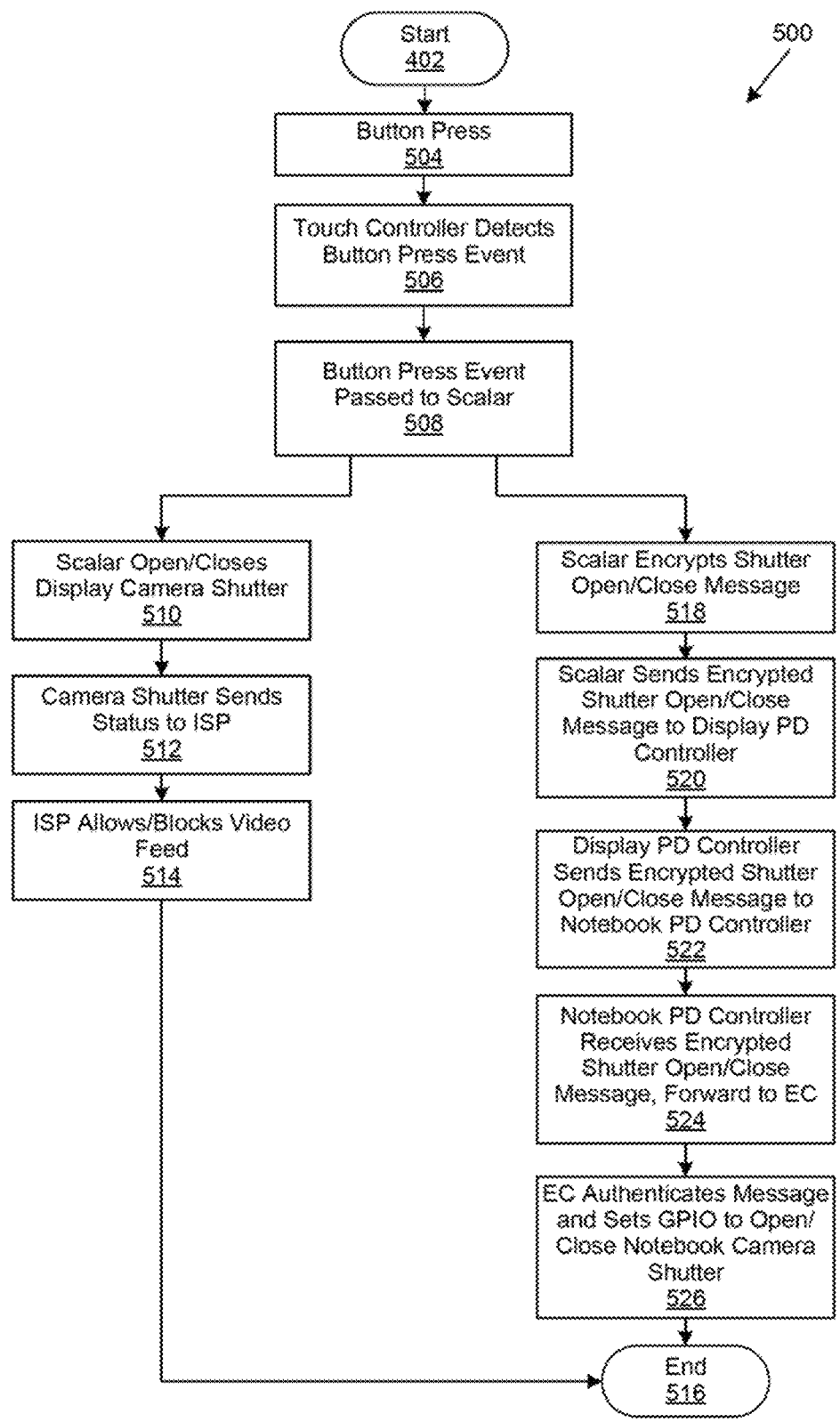
FIG. 5 is a generalized flowchart for activating and deactivating camera shutters when a control button on a display is pressed as implemented in the present invention.

FIG. 5 is a generalized flowchart for activating and deactivating camera shutters when a control button on a display is pressed. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. At step 504, a control button on control buttons 210 is pressed. A step 506, a touch controller detects the control button being pressed. At 508, the pressed button event 340 is sent to and received by the scalar 336.

At step 510, the scalar 336 informs 343 the ISP 338 to open or close the camera shutter 212 through message 344. At step 512, the camera shutter 212 provides status 342 to the ISP 338. At step 514, the ISP 338 either allows or blocks image and video feed from the notebook computer 202, depending on whether the camera shutter 212 is open or closed. At step 516, the process 516 ends.

In parallel to the steps of 510 to 516, at step 518 the scalar 336 encrypts a message to open or close shutter 208 of notebook computer 202. At step 520, the scalar 336 sends encrypted message 356 to PD controller 354. At step 522, PD controller 354 sends encrypted message 356 to PD controller(s) 352 to open or close the shutter 208 of notebook computer 202. At step 524, the PD controller(s) 352 receives the encrypted message 356 and forwards the encrypted message 356 to the EC 322. At step 526, the EC 322 authenticates the encrypted message 356 and sets the GPIO signal 320 to open or close camera shutter 212. At step 516, the process 500 ends.

Figure 6:
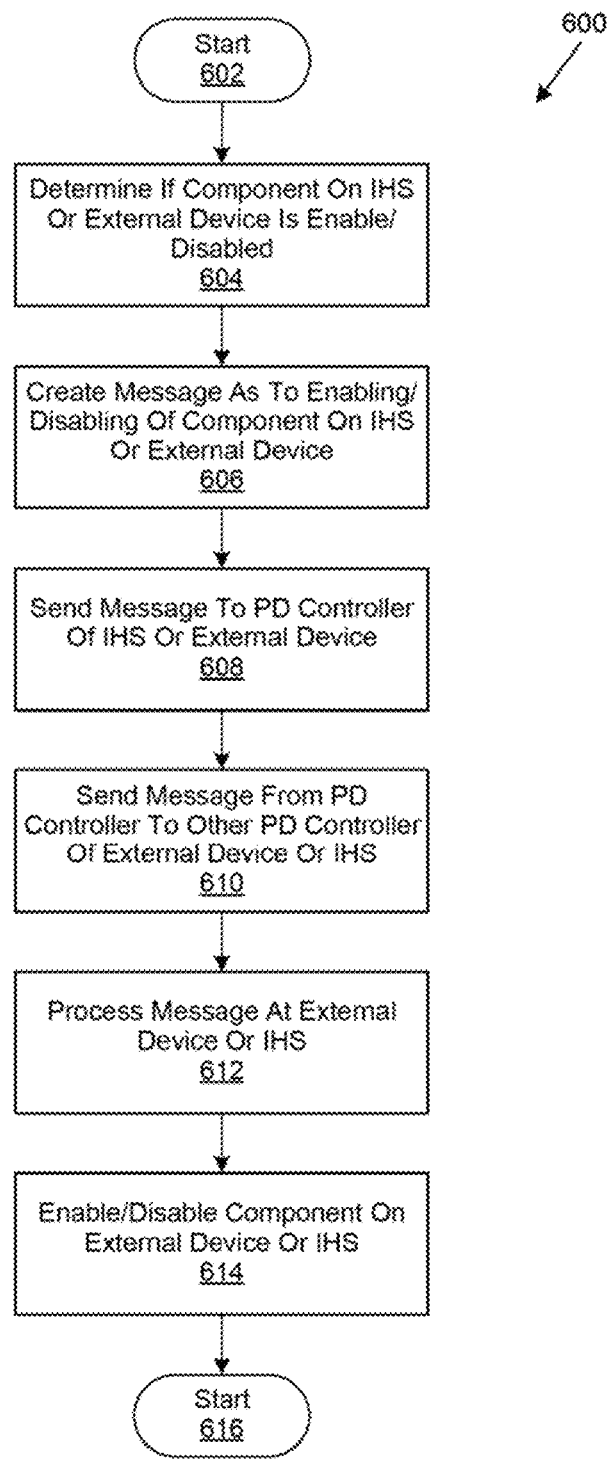
FIG. 6 is a generalized flowchart for synchronizing control of an information handling system, such as a notebook computer, with external devices, such as displays, where the synchronizing control is performed for similar components on the information handling and external display, such as camera shutters as implemented in the present invention.

FIG. 6 is a generalized flowchart for synchronizing control of an information handling system, such as a notebook computer, with external devices, such as displays, where the synchronizing control is performed for similar components on the information handling and external display, such as camera shutters. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, determining if a component, such as a camera shutter on either the information handling system (IHS) (e.g., notebook computer) or external device (e.g., displays) has been enabled or disabled, such as a user pressing an F4 key on the IHS or a control button on the external device.

At step 606, a message, such as a vendor defined encrypted message that indicates that the component is enabled or disable is created, such as by an embedded controller on the IHS (e.g., notebook computer) or scaler on the external device (e.g., displays).

At step 608, the message is sent to a power delivery (PD) controller on the IHS (e.g., notebook computer) or the external device (e.g., displays). At step 610, the PD controller that received the message, sends the message to PD controller on of a connected external device or IHS. The connection is through defined standardized communication connectors and cables implementing protocols, such as USB Type C standard.

At step 612, the message is processed at the connected external device or IHS, such as by a scaler of an external device or an embedded controller of the IHS. At step 614, enabling or disabling the component, such as a camera shutter on the external device or IHS is performed. At step 616, the process 600 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for synchronizing control of a camera shutter of an information handling system (IHS) and with external devices comprising:

determining if the camera shutter on the IHS or an external device is enabled or disabled;

creating a message or data at the IHS or the external device using a keyboard scanner that provides a general purpose input/output (GPIO) signal to an embedded controller as to enabling or disabling a component, wherein the embedded controller encrypts the message or data;

sending the encrypted message or data to a power delivery (PD) controller of the IHS or the external device;

sending the encrypted message or data received by the power delivery (PD) controller of the IHS or the external device to another PD controller of a connected external device or a connected IHS;

decrypting the encrypted message or data by a scalar;

processing the decrypted message or data at the connected external device or the connected IHS; and enabling or disabling a shutter on the connected external device or the connected IHS based on the processed message.

2. The computer-implementable method of claim 1, wherein the message is vendor defined message that is encrypted.

3. The computer-implementable method of claim 1, wherein the creating is performed by an embedded controller of an IHS or a scaler on an external device.

4. The computer-implementable method of claim 1, wherein sending the message between PD controllers implements USB Type C connections.

5. The computer-implementable method of claim 1, wherein the processing the message at the connected external device or the connected IHS is performed by scalar on the connected external device or an embedded controller on the connected IHS.

6. The computer-implementable method of claim 1, wherein the external device is a display.

7. An information handling system (IHS) comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for synchronizing control of a camera shutter of the information handling system (IHS) and with external devices comprising instructions executable by the processor and configured for:
determining if the camera shutter on the IHS is enabled or disabled;
creating a message or data using a keyboard scanner that provides a general purpose input/output (GPIO) signal to an embedded controller as to enabling or disabling a component, wherein the embedded controller encrypts the message or data;
sending the encrypted message or data to a power delivery (PD) controller;
sending the message or data from the PD controller of the IHS to another PD controller of a connected external device to enable or disable a shutter on the external device; and
decrypting the encrypted message or data by a scalar.

8. The information handling system (IHS) of claim 7 further comprising preventing image and video feed when camera shutter is disabled.

9. The information handling system (IHS) of claim 7, wherein the external device is a display.

10. The information handling system (IHS) of claim 7, wherein the determining comprises detecting if a function button on a keyboard is pressed.

11. The information handling system (IHS) of claim 7, wherein the creating is performed by an embedded controller.

12. The information handling system (IHS) of claim 7, wherein the sending the message from the PD controller of the IHS to another PD controller implements USB Type C connections.

13. An external device connected to an information handling system (IHS) that synchronizes control of a camera shutter of the IHS comprising:
determining if the camera shutter on the external device is enabled or disabled;
creating a message or data using a keyboard scanner that provides a general purpose input/output (GPIO) signal to an embedded controller as to enabling or disabling a component wherein the embedded controller encrypts the message or data;
sending the encrypted message or data to a power delivery (PD) controller;
sending the message or data from the PD controller of the IHS to another PD controller of a connected external device to enable or disable a shutter on the external device; and
decrypting the encrypted message or data by a scalar.

14. The external device of claim 13 further comprising preventing image and video feed when the camera shutter is disabled.

15. The external device of claim 13, wherein the determining comprises detecting if a control button is pressed.

16. The external device of claim 13, wherein a scaler performs the creating the message.

17. The external device of claim 13, wherein sending the message from the PD controller of the external device to another PD controller implements USB Type C connections.

* * * * *